United States Patent

McBride

[11] Patent Number: 5,117,041
[45] Date of Patent: May 26, 1992

[54] SULFONATION PROCESS

[75] Inventor: Edward F. McBride, Wilmington, Del.

[73] Assignee: E. I. Du Pont de Nemours and Company, Wilmington, Del.

[21] Appl. No.: 612,353

[22] Filed: Nov. 13, 1990

[51] Int. Cl.$^5$ .................... C07C 67/28; C07C 67/29; 560 87; 560 96; 528 272; 528 295
[52] U.S. Cl. ..................................... 560/87; 528/272; 528/295; 560/96
[58] Field of Search ................ 560/87, 96; 528/272, 528/295

[56] References Cited

U.S. PATENT DOCUMENTS 4,647,284  3/1987  Karydas et al. .................. 8/115.56
4,721,580  1/1988  Gosselink ........................ 252/90
4,883,899  11/1989  Muramoto et al. .............. 560/14

Primary Examiner—Michael L. Shippen
Assistant Examiner—Vera C. Clarke

[57] ABSTRACT

Allyl end-capped propylene terephthalate polyester oligomers are sulfonated in an aqueous system in the presence of a free radical initiator by a process in which only a part (about 15% to 40%) of the source of bisulfite is added at the start of the sulfonation step with the remainder being added later in that step, in such increments as will permit maintaining a clear single phase, to give sulfinate-containing sulfonated products, following which the sulfinate content is oxidized to give sulfonated end-capped propylene terephthalate polyester oligomers.

10 Claims, No Drawings

SULFONATION PROCESS

FIELD OF THE INVENTION

The present invention relates to an improved process for preparing sulfonated end-capped propylene terephthalate polyester oligomers which are useful as soil release agents.

BACKGROUND OF THE INVENTION

It has been long known that fibers and fabrics prepared from ethylene terephthalate polymers are subject to soiling by oil-based soils. For that reason, a wide variety of soil release agents has been developed. Particularly effective soil release agents and a three step process for their preparation are disclosed by Scheibel et al. in U.S. Pat. No. 4,968,451. In a typical embodiment of the Scheibel et al. process, the first two steps involve (i) transesterification under an inert atmosphere, and (ii) oligomerization under reduced pressure, of dimethyl terephthalate, propylene glycol and an allyl ethoxylate to yield allyl end-capped propylene terephthalate polyester oligomer (and methanol and excess propylene glycol as by-products). In a third step, the allyl end-capped propylene terephthalate polyester oligomer is sulfonated with a source of bisulfite in an aqueous system in the presence of a free radical initiator.

BRIEF SUMMARY OF THE INVENTION

The present invention relates to an improvement in the process disclosed in Scheibel et al. U.S. Pat. No. 4,968,451 (the contents of which are incorporated herein by reference). In the process of this invention, only a part of the required stoichiometric amount of the bisulfite source is reacted at the start of the sulfonation step with the allyl end-capped propylene terephthalate polyester oligomer, with the remainder of the source of bisulfite being added later in the sulfonation step.

DETAILED DESCRIPTION OF THE INVENTION

In accordance with this invention, allyl end-capped propylene terephthalate polyester oligomers, which can be represented by formula I set forth below, are sulfonated by a procedure in which only part (about 15% to 40%) of the source of bisulfite is added at the start of the sulfonation step with the remainder being added later in that step, in such increments as will permit maintaining a clear single phase, to give sulfinate-containing sulfonated product which can be represented by formula II set forth below, following which the sulfinate content is oxidized to give a sulfonated end-capped propylene terephthalate polyester oligomers which can be represented by formula III set forth below:

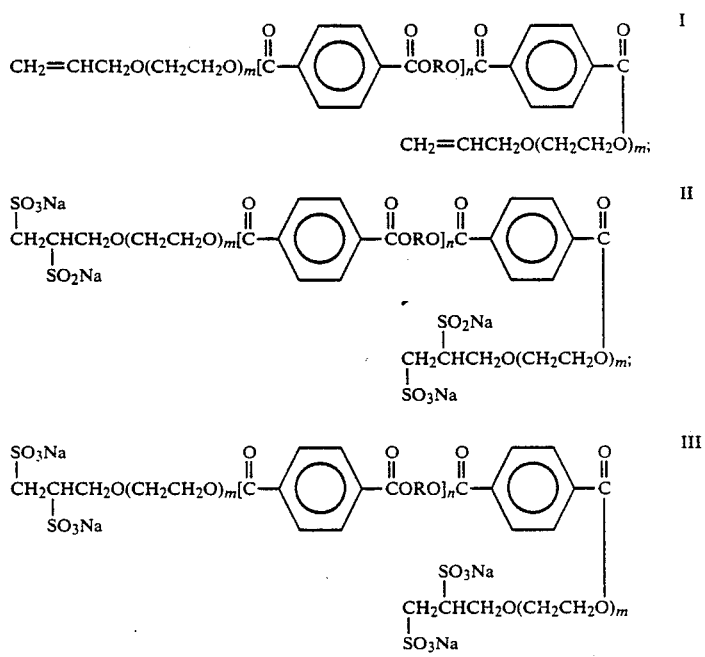

wherein in each of the formulae
R is

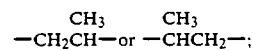

m is an integer from 9 to 15, preferably 11, and
n is 1.5 to 6, preferably 2.

As a result, product concentration can be increased to a commercially acceptable 35–50% range, preferably 38–42%. Morever, major increases in volumetric efficiency and productivity can be achieved. If all the bisulfite were added at the beginning of the sulfonation reaction at raw material concentration sufficient to give product concentrations in the range between 35 and 50%, phase separation would occur which would prevent subsequent reaction.

The preparation of the allyl end-capped propylene terephthalate polyester oligomer which serves as a raw material in the process of this invention is described in detail in my copending application Ser. No. 07/612,352 filed concurrently herewith abandoned, the contents of which are incorporated herein by reference. In the sulfonation of the allyl end-capped propylene terephthalate polyester oligomer, sodium bisulfite is preferred; between about 3.0 and 4.8 mols of the bisulfite per mol of that terminally unsaturated oligomer should be used, preferably between about 4.0 mols and 4.4 mols. The sulfonation temperature initially should be in the range of about 10° to 30° C., preferably about 15° to 25° C. (the initial reaction temperature can be permitted to reach 40° C. so long as one avoids the formation of more than one phase). In the final stage of the reaction, one can permit the temperature to reach as high as 40° C. The sulfonation pressure should be about atmospheric and the sulfonation time is from about 1.5 to about 8 hours. Between about 15% and 40% of the stoichiometric amount of the bisulfite is added to the initial reaction mass, and the remainder is added about one-half hour or longer after the sulfonation reaction has been initiated so as to provide a final product concentration between about 35-50% (40% preferred).

Use of the foregoing temperatures and partial conversion of the starting material to the desired final product aids in negating phase separation, with the final product acting as a hydrotrope. For example, the solubilities of the reactants and the final product are such that, in order to maintain a one phase system with an initial bisulfite content of about 40% of the total, the initial temperature must be below about 15° C., and with an initial bisulfite content of about 20% of the total, the initial temperature should be below about 25° C. As the concentration of bisulfite decreases, a one-phase system can be maintained at higher temperatures.

Because of the cloud point (insolubility) problems between the allyl end-capped propylene terephthalate polyester oligomer and sodium bisulfite solution used to sulfonate the allyl groups, one must add the bisulfite in portions and/or over time. A combination of sodium persulfate and ferrous sulfate is used to generate free radicals which initiate addition of bisulfite to the allyl groups.

The following examples are given to further illustrate the invention, not to limit it.

EXAMPLE 1

To a 12 liter reactor, were charged 2268 g 29.8 mole, of 1,2-propanediol, 2893 g, 15.0 mole of dimethylterephthalate, 2732 g, 5.0 mole, of allyl alcohol ethoxylate (containing 11 ethylene oxide units), 16.4 g of zinc acetate dihydrate, 7.6 g of lithium acetate dihydrate and 14.8 g of 2,6-di-t-butyl-p-cresol. The reaction mass was heated to 145° C. under nitrogen at which point methanol was distilling from the mass. Continued heating to 180° C. resulted in most of the methanol being (72%) distilled off. The second portion, 2732 g, 5.0 mole, of allyl alcohol ethoxylate (11EO) was then added. The mass was heated to 220° C. and held for 3.75 hours. Vacuum was applied to the reactor. Heat was applied and propylene glycol was removed by distillation. The mass was held for a total of 13.3 hours under vacuum. The temperature was raised to 225° C. during this time. The reaction mass was cooled to 60° C. under vacuum. The vacuum was released to yield 8133 g of amber colored allyl end-capped propylene terephthalate polyester oligomer as a thick liquid.

To a 72 liter reactor were charged 47.5 lb of water containing less than 2 ppm of calcium and magnesium, and 15755 g, 9.6 mole, of the above-described allyl end-capped propylene phthalate polyester oligomer. To this solution was added 1734 g, 7.6 mols of 84% sodium bisulfite solution. The pH of the mass was adjusted with 113 ml of 98% sulfuric acid to 2.3. The light yellow solution at 18° C. was a clear, single phase. To this were added 2.13 g of ferrous sulfate heptahydrate in 15 ml of water, followed by 120 g, 0.124 mole of a 25% aqueous solution of sodium persulfate. Within 5 minutes a 3° C. temperature rise was noted as the addition of bisulfite to the allyl group started. After 20 minutes, addition of 6937 g, 30.6 mols (balance of the total) of 84% sodium meta bisulfite solution was started at a controlled rate over one hour. At the end of this addition, a second 120 g portion of the sodium persulfate solution was added. The temperature was allowed to rise to 29° C. After 45 minutes, equal portions of the remaining 120 g of sodium persulfate solution were added uniformly over 3 hours. Titration of a sample of the above reaction mass with a 0.1N iodine solution showed the desired amount (about 10%) of residual excess bisulfite. After a one hour hold, 591 g, 5.21 mole of 30% hydrogen peroxide were added with cooling to keep the temperature below 40° C. This converted the excess bisulfite to sulfate and also oxidized sulfinate groups on the beta carbon atoms to sulfonate groups. The pH was then adjusted to about 6.0 with 984 g, 7.35 mole, of 30% caustic. Then an additional 1293 g, 11.4 mole, of 30% hydrogen peroxide were added in several portions with cooling. After obtaining a negative test for hydrogen peroxide after standing all week-end, the pH was adjusted to 6.0 with 33 g. of 30% caustic. Then 32.9 g., 0.1 mole, of a 12% solution of sodium borohydride in 40% caustic were added under nitrogen. After stirring for 3-4 hours, the pH was adjusted to 6.0 with 21.3 g of 98% sulfuric acid to yield 108 lb net of a sulfonated end-capped propylene terephthalate polyester oligomer product at a 40% active ingredient in water.

EXAMPLE 2

In a one liter flask were placed 282 ml of water and 224 g, 0.136 mols of allyl end-capped propylene terephthalate polyester oligomer prepared by the process of Example 1. To this solution at 22° C. was added 1 g of 98% sulfuric acid to give a pH of 3.2, followed by the addition of 27.2 g, 0.108 mol (20% of total), of 76% sodium bisulfite solution. Then 0.030 g of ferrous sulfate heptahydrate in a few ml of water was added, followed by 3.45 g, 0.013 mol, of sodium persulfate as a 12.5% aqueous solution at pH 3.3 and a solution temperature of 23° C. After 15 minutes, the balance of the sodium bisulfite addition (109 g, 0.436 mol) was added at a uniform rate over one hour. The solution remained clear, with the temperature increasing to 24° C. and pH of 3.2. A second one-third portion of the persulfate solution (3.45 g, 0.013 mol) was then added with the temperature increasing to 29° C. and pH dropping to 2.9. After 30 minutes, the final portion of sodium persulfate solution (3.45 g, 0.013 mol) was added uniformly over about 2 hours. Titration of a sample of the above reaction mass with a 0.1N iodine solution showed about 13% of residual excess bisulfite. Then a total of 27.3 g, 0.166 mol), of 30% hydrogen peroxide was added with cooling, keeping the temperature below 34° C. After obtaining a negative test for peroxide, the solution was adjusted to pH 6 with 16.6 g of 30% sodium hydroxide. The product consisted of 666 g of a 40% sulfonated end-capped polyester oligomer in water. To one-half of this material was added 100 ppm of sodium borohydride as a 12% solution in 40% sodium hydroxide after increasing the pH to about 10 to give a sulfonated end-capped propylene terephthalate polyester oligomer product which was odorless in contrast to a slightly objectionable odor from the untreated portion.

EXAMPLE 3

To a 2 liter flask, were charged 415 g, 5.46 mols, of 1,2-propanediol; 530 g, 2.73 mols, of dimethylterephthalate; 300 g, 0.55 mol, of allyl alcohol ethoxylate (containing 11 ethylene oxide units); 2.1 g, 0.01 mol, of zinc acetate dihydrate; 1.0 g, 0.01 mol, of lithium acetate dihydrate and 1.9 g, 0.01 mol, of 2,6-di-t-butyl-p-cresol. The reaction mass was heated to 145° C. under nitrogen at which point methanol was distilled from the mass. Continued heating to 175° C. resulted in most of the methanol (56%) being distilled off, at which point the second portion, 300 g, 0.55 mol, of allyl alcohol ethoxylate was added. The mass was heated to 218° C. and held for about 3 hours; vacuum was applied to the flask and propylene glycol was removed by distillation. The mass was held for a total of about 12 hours under about 2 mm Hg vacuum. The temperature was raised to 225° C. during this time. The reaction mass was cooled to 60° C. under vacuum. The vacuum was released to yield 1,115 g, 0.55 mol, of amber-colored allyl end-capped oligomeric polyester as a thick liquid.

In a one liter flask was placed 374 ml of water and 374 g, 0.182 mol, of the above-described allyl end-capped propylene terephthalate polyester oligomer. To the resulting solution at 24° C. was added 36.4 g, 0.146 mol (20% of total), of 76% sodium bisulfite solution. Then 0.040 g of ferrous sulfate heptahydrate in a few ml of water was added followed by 4.6 g, 0.002 mol) of sodium persulfate as a 12.5% aqueous solution and 1.7 g of 98% sulfuric acid to give a pH 3.4 and a solution temperature of 25° C. Then 50 ml of water was added to reduce viscosity. After 15 minutes, the balance of the sodium bisulfite (145 g, 0.582 mol) was added at a uniform rate over one hour. After about 10 minutes into this addition, 50 ml of more water was added and enough 98% sulfuric acid to keep the pH below 3.25. This required 4.7 g of sulfuric during this final addition of sodium bisulfite. The solution remained clear with the temperature increasing to 28° C. with a pH of 3.2. A second one-third portion of persulfate solution (4.6 g, 0.002 mol) was then added with the temperature increasing to 31° C. and pH dropping to 3. After 30 minutes, the final portion of sodium persulfate solution (4.6 g, 0.002 mol) was added uniformly over about 2 hours. Titration of a sample of the above reaction mass with a 0.1N iodine solution showed about 11% of residual excess bisulfite. Then a total of 35 g, 0.31 mol, of 30% hydrogen peroxide was added in several portions with cooling until a positive peroxide test held for about 4 hours. The pH was adjusted to 5.6 with 23 g of 30% sodium hydroxide. The product consisted of 1,081 g of a 40% active ingredient sulfonated end-capped propylene terephthalate polyester oligomer in water.

I claim:

1. In a process for sulfonating allyl end-capped propylene terephthalate polyester oligomer prepared by reacting dimethyl terephthalate, propylene glycol, and an allyl ethoxylate, the improvement comprising, at a temperature in the range between about 10° C. and 40° C., reacting at the start of the sulfonation reaction only a part of the stoichiometric amount of the sulfonating agent needed to react fully with allyl end-capped propylene terephthalate polyester oligomer, which is represented by formula:

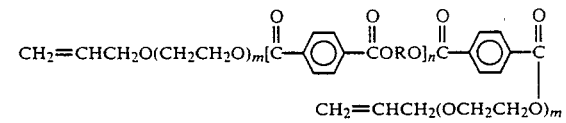

with the remainder of the sulfonating agent being added thereafter in such increments as permit maintaining a clear single phase, and recovering, at concentrations in the range between about 35% an 50%, a sulfonated endcapped propylene terephthalate polyester oligomer which is represented by the formula:

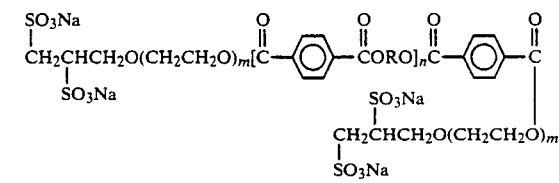

where in each of the formulae
R is

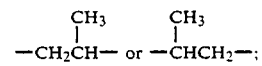

m is an integer from 9 to 15, and
n is 1.5 to 6.

2. The process of claim 1 wherein only about 15% to 40% of the stoichiometric amount of the sulfonating agent is used at the start of the sulfonation reaction.

3. The process of claim 2 wherein the reaction temperature at the start of the sulfonation reaction is in the range between about 10° and 30° C.

4. The process of claim 3 wherein said temperature is in the range between about 15° and 25° C.

5. The process of claim 1 wherein m is 11.

6. The process of claim 1 wherein n is 2.

7. The process of claim 1 wherein said sulfonated end-capped oligomeric polyester is recovered at a concentration of about 40%.

8. The process of claim 1 wherein said sulfonating agent is sodium bisulfite.

9. The process of claim 1 wherein about 3.0 to 4.8 mols of said sulfonating agent per mol of said allyl end-capped propylene terephthalate polyester oligomer are used in the sulfonation reaction.

10. The process of claim 9 wherein about 4.0 to 4.4 mols of said sulfonating agent per mol of said allyl end-capped propylene terephthalate polyester oligomer are used in the sulfonation reaction.

* * * * *